(12) United States Patent
Sun et al.

(10) Patent No.: US 11,478,068 B2
(45) Date of Patent: Oct. 25, 2022

(54) ELECTRIC TOOTHBRUSH ADOPTING FORCE SENSING ARRAY

(71) Applicant: PixArt Imaging Inc., Hsin-Chu County (TW)

(72) Inventors: Chih-Ming Sun, Hsin-Chu County (TW); Ming Shun Manson Fei, Hsin-Chu County (TW); Yi-Hsien Ko, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 257 days.

(21) Appl. No.: 17/065,865

(22) Filed: Oct. 8, 2020

(65) Prior Publication Data

US 2021/0022489 A1 Jan. 28, 2021

Related U.S. Application Data

(63) Continuation-in-part of application No. 16/247,573, filed on Jan. 15, 2019, now Pat. No. 10,921,199.

(51) Int. Cl.
| | |
|---|---|
| *G01L 1/00* | (2006.01) |
| *A46B 15/00* | (2006.01) |
| *A61C 17/22* | (2006.01) |
| *G01L 1/14* | (2006.01) |
| *A61C 17/34* | (2006.01) |

(52) U.S. Cl.
CPC ........ *A46B 15/0012* (2013.01); *A61C 17/221* (2013.01); *G01L 1/144* (2013.01); *G01L 1/148* (2013.01); *A61C 17/3481* (2013.01)

(58) Field of Classification Search
CPC .............. A46B 15/0012; A61C 17/221; A61C 17/3481; G01L 1/144; G01L 1/148
See application file for complete search history.

(56) References Cited

U.S. PATENT DOCUMENTS

| 8,898,843 | B2* | 12/2014 | Okazaki | A61C 17/221 |
| | | | | 345/174 |
| 9,724,001 | B2* | 8/2017 | Dykes | A46B 15/001 |
| 2009/0025156 | A1* | 1/2009 | Asada | A61C 17/3481 |
| | | | | 15/22.1 |
| 2011/0010875 | A1* | 1/2011 | Iwahori | G06V 10/17 |
| | | | | 15/22.1 |
| 2012/0110763 | A1* | 5/2012 | Jungnickel | A46B 15/0044 |
| | | | | 15/105 |
| 2012/0284944 | A1* | 11/2012 | Fischer | A46B 15/004 |
| | | | | 15/167.1 |
| 2014/0100489 | A1* | 4/2014 | Altshuler | A46B 15/0036 |
| | | | | 601/18 |

(Continued)

FOREIGN PATENT DOCUMENTS

| CN | 105278792 A | 1/2016 |
| TW | 201022421 A | 6/2010 |

*Primary Examiner* — Max H Noori
(74) *Attorney, Agent, or Firm* — WPAT, PC

(57) ABSTRACT

There is provided an electric toothbrush including a toothbrush head, a toothbrush handle and a force sensing array. The force sensing array is arranged on the toothbrush head and/or the toothbrush handle. When the force sensing array is arranged on the toothbrush head, it is able to detect the force uniformity of brush hairs. When the force sensing array is arranged on the toothbrush handle, it is able to control the vibration strength of the brush hairs and detect the pressing force of the brush hairs.

20 Claims, 12 Drawing Sheets

(56) References Cited

U.S. PATENT DOCUMENTS

| | | | |
|---|---|---|---|
| 2015/0297327 A1* | 10/2015 | Miller | A61C 17/221 15/22.1 |
| 2016/0374609 A1* | 12/2016 | Vetter | A46B 15/0012 433/27 |
| 2018/0266898 A1 | 9/2018 | Yoon et al. | |
| 2019/0167400 A1* | 6/2019 | Barnes | A61N 5/0603 |
| 2021/0022489 A1* | 1/2021 | Sun | A46B 9/04 |
| 2021/0227965 A1* | 7/2021 | Bevis | A46B 5/0037 |

* cited by examiner

ELECTRIC TOOTHBRUSH ADOPTING FORCE SENSING ARRAY

CROSS REFERENCE TO RELATED APPLICATION

The present application is a continuation-in-part application of U.S. Ser. No. 16/247,573, filed on Jan. 15, 2019, the disclosure of which is hereby incorporated by reference herein in its entirety.

BACKGROUND

1. Field of the Disclosure

This disclosure generally relates to an electric toothbrush and, more particularly, to an electric toothbrush adopting a force sensing array on the toothbrush head and/or on the toothbrush handle.

2. Description of the Related Art

Conventionally, a force sensor including a drive electrode and a sensing electrode is formed as an individual module. The drive electrode and the sensing electrode are then electrically connected to a circuit board via an additional connector.

Please referring to FIG. 1, for example, the force sensor provided in U.S. Patent Application No. 2017/0350771 A1 includes a top electrode 111, a bottom electrode 121 and a pair of force sensitive layers 112 and 122 to form an individual force sensor. The force sensor has to be connected to a driving circuit 222 and a sensing circuit 223 of a system 23 via a connector.

SUMMARY

The present disclosure provides an electric toothbrush that controls the vibration strength and analyzes the force distribution of multiple bundles of brush hairs according to multiple force values detected by a force sensing array.

The present disclosure further provides an electric toothbrush that provides multiple force detecting points of a force sensing array 360 degrees surrounding most region of a toothbrush handle to fit various holding habits.

The present disclosure provides an electric toothbrush including a force sensor, a toothbrush head and a processor. The force sensor includes a substrate laid with multiple sets of drive electrodes and sensing electrodes, and a polymer material layer adhering to the substrate and covering on the multiple sets of drive electrodes and sensing electrodes to form multiple force detecting points. A first surface of the toothbrush head is arranged with the force sensor and multiple bundles of brush hairs respectively opposite to the multiple force detecting points of the force sensor. The processor is coupled to the multiple force detecting points, and configured to analyze a force uniformity of the multiple bundles of brush hairs according to multiple force values outputted by the multiple force detecting points.

The present disclosure further provides an electric toothbrush including a force sensor, a toothbrush head, a toothbrush handle and a processor. The force sensor includes a substrate laid with multiple sets of drive electrodes and sensing electrodes, and a polymer material layer adhering to the substrate and covering on the multiple sets of drive electrodes and sensing electrodes to form multiple force detecting points. A first surface of the toothbrush head is arranged with multiple bundles of brush hairs. The multiple force detecting points of the force sensor are arranged surrounding the toothbrush handle. The processor is coupled to the multiple force detecting points, and configured to calculate a summation or an average of multiple force values outputted by the multiple force detecting points, and control a vibration frequency of the multiple bundles of brush hairs according to the summation or the average.

The present disclosure further provides an electric toothbrush including a force sensor, a toothbrush head, a toothbrush handle and a processor. The force sensor includes a substrate laid with multiple sets of drive electrodes and sensing electrodes, and a polymer material layer adhering to the substrate and covering on the multiple sets of drive electrodes and sensing electrodes to form multiple force detecting points. A first surface of the toothbrush head is arranged with multiple bundles of brush hairs. The multiple force detecting points of the force sensor are arranged surrounding the toothbrush handle. The processor is coupled to the multiple force detecting points, and configured to calculate a first direction force and a second direction force according to multiple force values outputted by the multiple force detecting points, and calculate a pressing force of the multiple bundles of brush hairs according to a force difference between the first direction force and the second direction force.

In the embodiments of the present disclosure, the substrate is a printed circuit board (PCB) or a flexible circuit board (FCB).

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
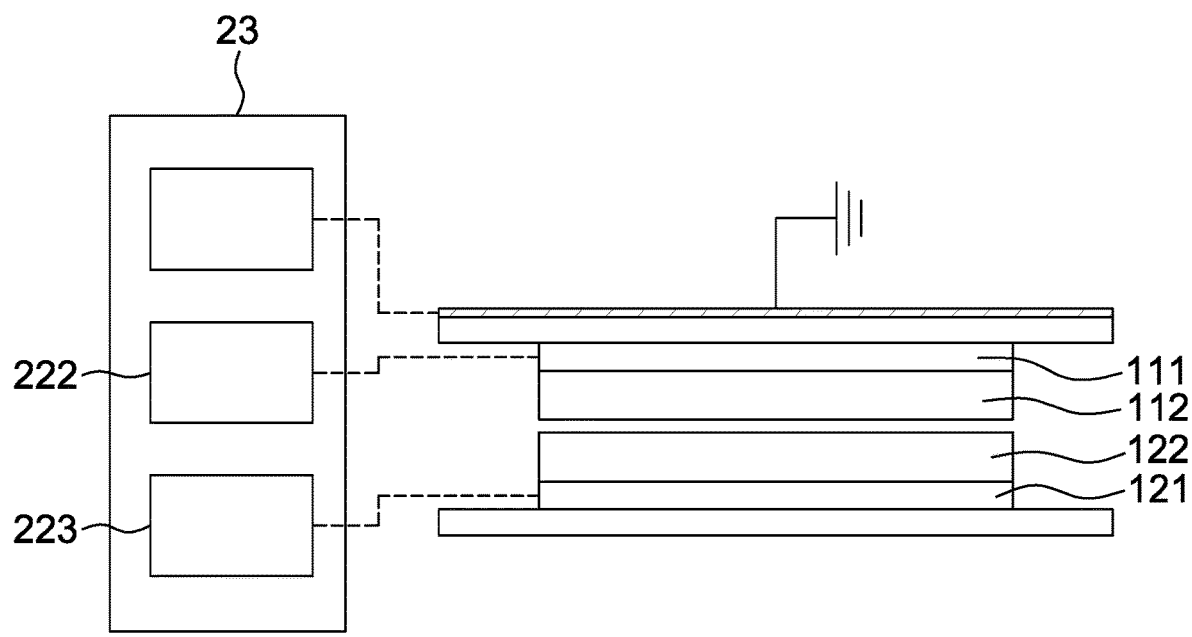
FIG. 1 is a schematic diagram of a conventional force sensor.
Figure 2A:
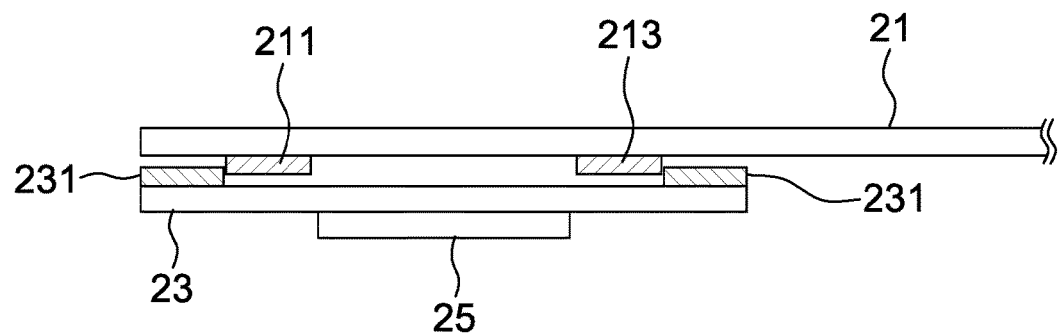
FIG. 2A is a schematic diagram of a force sensor, not being pressed, according to a first embodiment of the present disclosure.
Figure 2B:
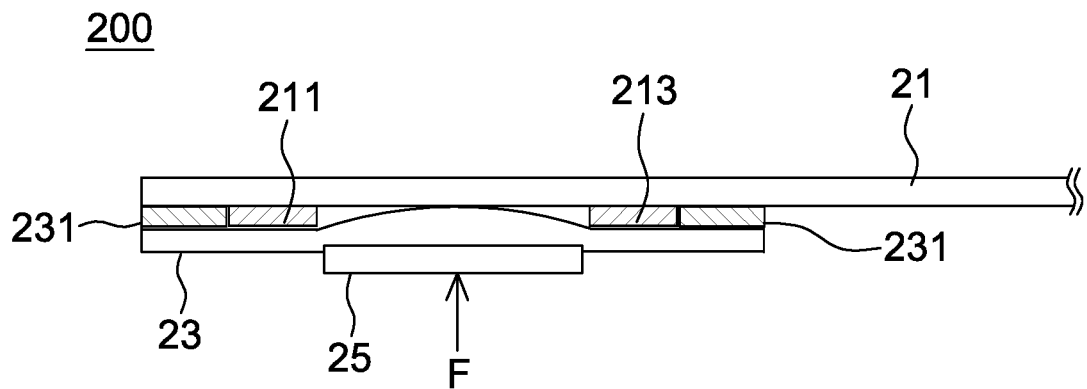
FIG. 2B is a schematic diagram of a force sensor, being pressed by a force, according to the first embodiment of the present disclosure.

Referring to FIGS. 2A and 2B, they are cross sectional views of a force sensor 200 according to a first embodiment of the present disclosure, wherein FIG. 2A shows the force sensor 200 not being pressed, and FIG. 2B shows the force sensor 200 being pressed by a force F such that a polymer material layer 23 is deformed upward. In the present disclosure, the polymer material layer 23 is selected from the material whose dielectric constant changes when the polymer material layer 23 is pressed by the force F. Accordingly, when the polymer material layer 23 is arranged between two electrodes supplied with electricity, capacitance of a capacitor between the two electrodes changes due to the change of the dielectric constant such that a force is detectable. For example, when the capacitance changes to exceed a threshold, a processor identifies that a force F is existing. In the present disclosure, said processor connects to the two electrodes via traces laid on the substrate 21.

In the present disclosure, a first surface (e.g., upper surface facing the substrate 21 in FIGS. 2A and 2B) of the polymer material layer 23 is not in contact with the substrate 21 or other circuits disposed on the substrate 21.

The force sensor 200 is applicable to various input devices that detect an input through detecting a press signal, e.g., a mouse, a keyboard, a remote controller, a touch pad or the like, but not limited to.

Figure 3:
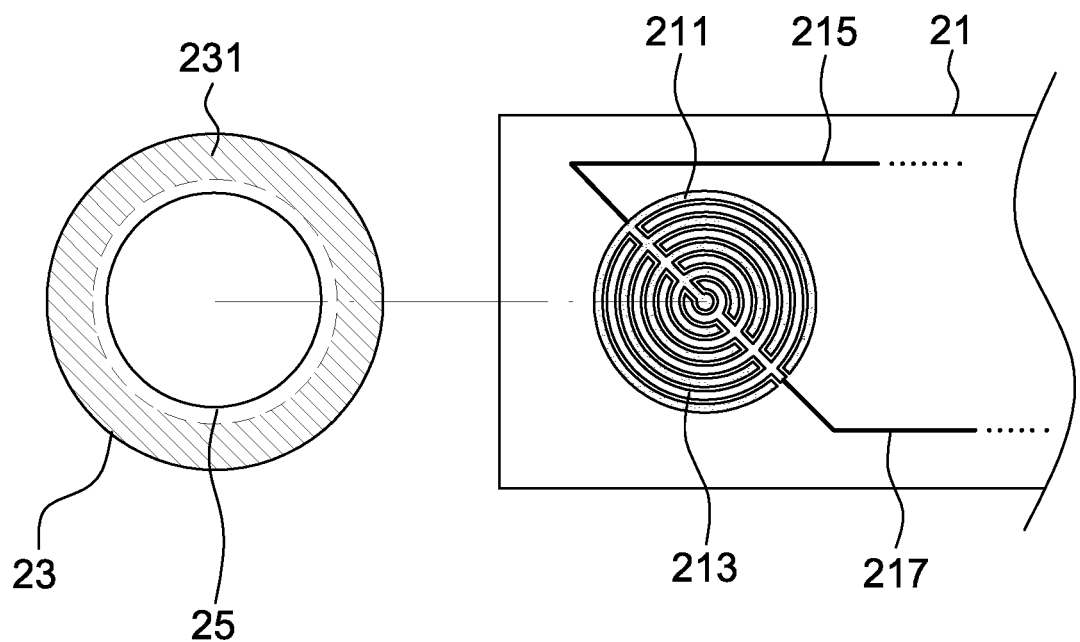
FIG. 3 is a top view of a force sensor according to one embodiment of the present disclosure.

Please referring to FIG. 3 together, it is a top view of a force sensor 200 according to one embodiment of the present disclosure. The force sensor 200 includes a substrate 21, a polymer material layer 23 and an adhesive layer 231. In some embodiments, the force sensor 200 further includes a bump 25 arranged on a second surface (FIGS. 2A-2B showing a bottom surface) of the polymer material layer 23 not facing the substrate 21. The bump 25 is used to allow an external force F to uniformly distribute on the polymer material layer 23, but the bump 25 is not necessary to be implemented. A cross sectional area of the bump 25 is selected to be equal to or smaller than the polymer material layer 23 without particular limitations. A surface of the bump 25 not attaching to the polymer material layer 23 is a curved surface or a plane surface. The bump 25 is made of plastic or glass. For example, the bump 25 is arranged opposite to a bottom of a button on the applied device to receive a force from the button.

The substrate 21 is, for example, a printed circuit board (PCB) or a flexible circuit board (FCB) without particular limitations. The substrate 21 has a layout circuit that includes a drive electrode 211 and a sensing electrode 213, as well as multiple traces (e.g., FIG. 3 showing two traces 215, 217, but not limited to) respectively connecting to the drive electrode 211 and the sensing electrode 213. The drive electrode 211 and the sensing electrode 213 are coplanar arranged. In other words, in manufacturing the substrate 21, said multiple traces (conductive lines such as copper lines, gold lines or silver lines) are laid on the substrate 21 together with the drive electrode 211 and the sensing electrode 213. In addition, electrical contacts for disposing other electronic devices, e.g., a processor and a driving circuit, are also manufactured on the substrate 21.

The polymer material layer 23 covers on the drive electrode 211 and the sensing electrode 213. In one aspect, the polymer material layer 23 also covers on a space (or air space) between the drive electrode 211 and the sensing electrode 213. When a force F is applied on the polymer material layer 23, a part of the polymer material layer 23 is squeezed into the space between the drive electrode 211 and the sensing electrode 213 to accordingly change capacitance of a capacitor therebetween. That is, in detecting a capacitance change between the drive electrode 211 and the sensing electrode 213, a distance (e.g., transverse distance in FIGS. 2A and 2B) between the drive electrode 211 and the sensing electrode 213 is not changed, and the capacitance change is caused by a change of electrical property of the polymer material layer 23 (even through without distortion) due to the external force F to change a detected signal of the sensing electrode 213. The polymer material layer 23 is selected from light transparent or opaque material without particular limitations.

The adhesive layer 231 is for adhering the polymer material layer 23 to the substrate 21. In one non-limiting embodiment, the adhesive layer 231 is arranged at an edge region of the polymer material layer 23 (as shown in FIG. 3) and adhering to a surface of the substrate 21. Accordingly, after the polymer material layer 23 is attached to the substrate 21, a capacitive force sensor is accomplished. As the electrode set (including drive and sensing electrodes) is directly manufactured on the surface of the substrate 21, said capacitive force sensor is not connected to the substrate 21 via an additional electrical connector. In one non-limiting embodiment, the adhesive layer 231 is selected from the material that can be repeatedly attached and detached such that it is possible to remove the polymer material layer 23 from the substrate 21 and adhere the polymer material layer 23 to the substrate 21 again via the adhesive layer 231.

Figure 2C:
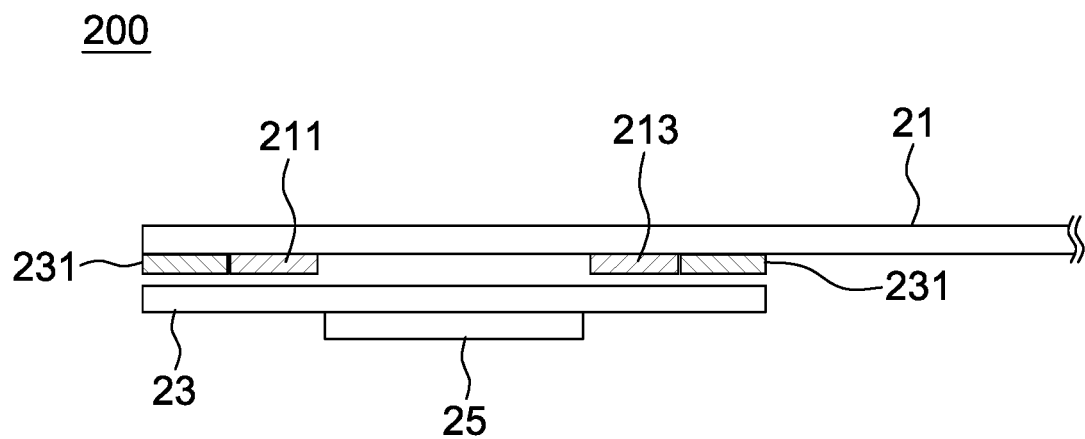
FIGS. 2C-2D are schematic diagrams of a force sensor according to some other embodiments of the present disclosure.

In some aspects, the adhesive layer 231 is firstly arranged on a surface of the substrate 21, as shown in FIG. 2C. The polymer material layer 23 is attachable to and detachable from the substrate 21 via the adhesive layer 231. For example, when the polymer material layer 23 is being removed from the substrate 21, the adhesive layer 231 is not removed at the same time.

Figure 2D:
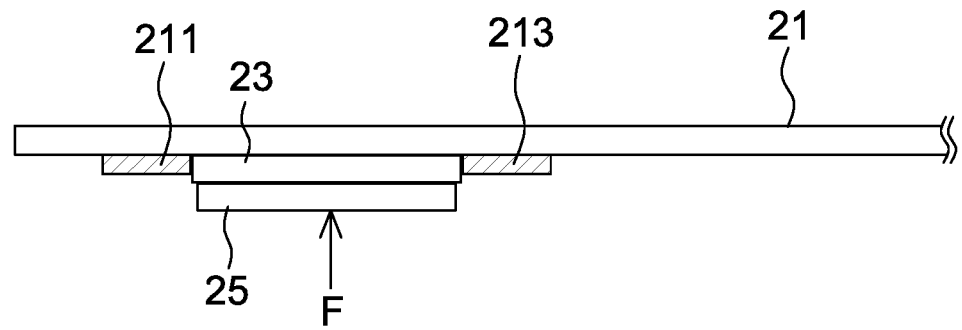

In alternative aspects, the polymer material layer 23 is directly printed or coated on a surface of the substrate 21 (covering the drive electrode 211 and the sensing electrode 213 or not) such that the adhesive layer 231 is omitted, as shown in FIG. 2D. In this case, an external force directly presses on the polymer material layer 23 or through a bump 25 to change the dielectric constant thereof.

Figure 4A:
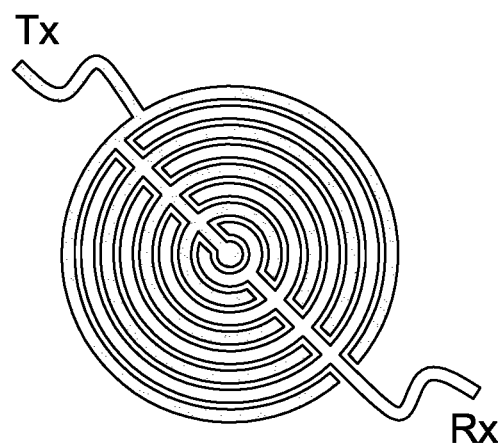
FIGS. 4A-4C are schematic diagrams of electrode patterns of a force sensor according to some embodiments of the present disclosure.
Figure 4B:
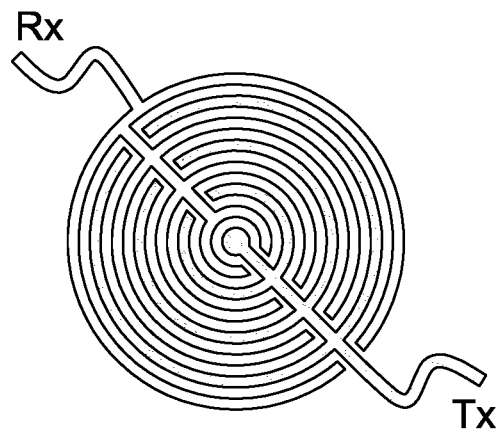
Figure 4C:
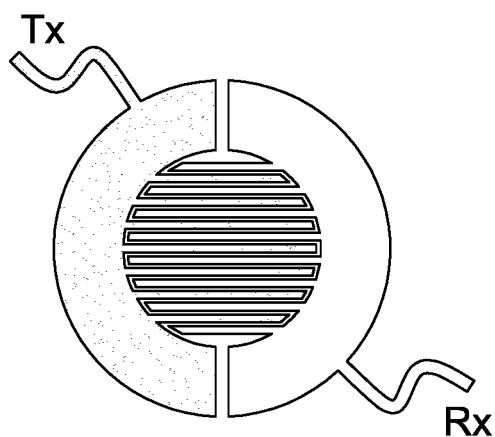

It should be mentioned that although FIGS. 2A and 2B only show one drive electrode 211 and one sensing electrode 213, it is only intended to simplify the drawing to show the distortion of the polymer material layer 23 while being pressed. However, it should be mentioned that the polymer material layer 23 is not necessary to be distorted to change the dielectric constant when the force F is pressing thereon. FIG. 2B is only intended to show a pressing state using the distortion of the polymer material layer 23 for easier understanding. In the present disclosure, the drive electrode Tx and the sensing electrode Rx are arranged properly, e.g. FIGS. 4A-4C showing different configurations, and preferably have a pitch therebetween within a predetermined distance range. The drive electrode Tx receives a drive signal via a trace (e.g., 215) from a driving circuit, and the sensing electrode Rx outputs a detected signal via a trace (e.g., 217) to a processor for identifying the pressing force.

In FIG. 4A, a drive electrode Tx and a sensing electrode Rx are arranged in a concentric circle, the electrode width is, for example, 200 micrometers and a pitch between the drive electrode Tx and the sensing electrode Rx is, for example, 150 micrometers. In FIG. 4B, a drive electrode Tx and a sensing electrode Rx are also arranged in a concentric circle, the electrode width is, for example, 150 micrometers and a pitch between the drive electrode Tx and the sensing electrode Rx is, for example, 250 micrometers. In FIG. 4C, a drive electrode Tx and a sensing electrode Rx are arranged as parallel straight lines, the electrode width is, for example, 200 micrometers and a pitch between the drive electrode Tx and the sensing electrode Rx is, for example, 200 micrometers.

Figure 7:
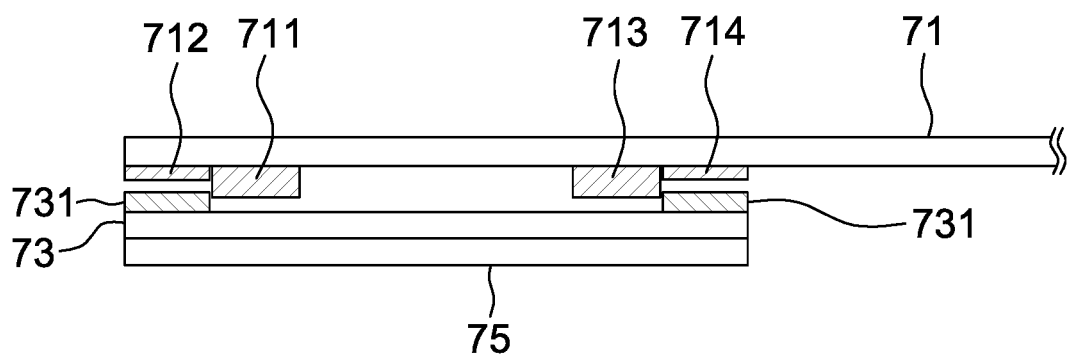
FIG. 7 is a cross sectional view of a force sensor according to a second embodiment of the present disclosure.

Referring to FIG. 7, it is a cross sectional view of a force sensor 700 according to a second embodiment of the present disclosure. The difference between the force sensor 700 and the force sensor 200 of FIG. 2A includes: (1) the substrate 71 of the force sensor 700 in FIG. 7 being further laid with metal layers 712, 714 during the substrate manufacturing process, and the metal layers 712, 714 being for adhering to the adhesive layer 731 to reduce a thickness of the adhesive layer 731; and (2) the bump 75 in FIG. 7 being shown to have a substantially identical size to the polymer material layer 73. The components of the force sensor 700 including the substrate 71, drive electrode 711, sensing electrode 713, adhesive layer 731 and polymer material layer 73 are identical to those of the first embodiment, and thus details thereof are not repeated herein.

Figure 8:
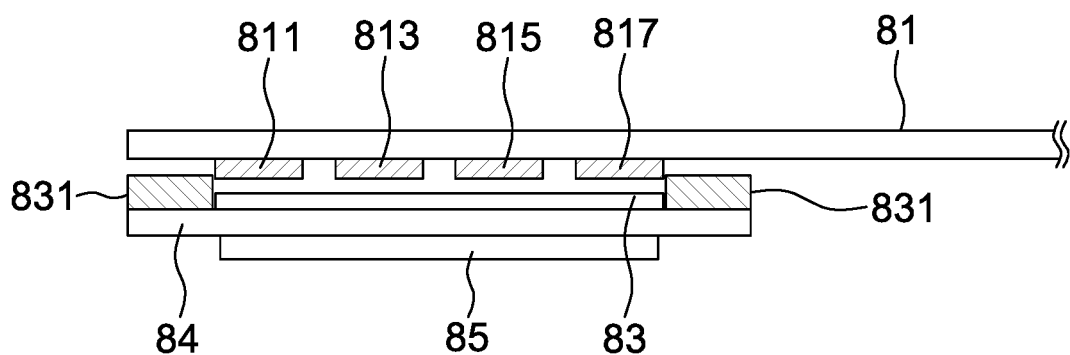
FIG. 8 is a cross sectional view of a force sensor according to a third embodiment of the present disclosure.

Referring to FIG. 8, it is a cross sectional view of a force sensor 800 according to a third embodiment of the present disclosure. The difference between the force sensor 800 and the force sensor 200 of FIG. 2A includes: (1) the force sensor 800 in FIG. 8 further including a carrying layer 84 attached to a surface (FIG. 8 showing a bottom surface) of the polymer material layer 83 not facing the substrate 81, and the carrying layer 84 being used to carry the polymer material layer 83; and (2) two sets of electrodes 811 and 813 as well as 815 and 817 being formed on the substrate 81 in FIG. 8. In this embodiment, an area of the carrying layer 84 is larger than that of the polymer material layer 83, and the adhesive layer 831 is arranged on the carrying layer 84. The material of the carrying layer 84 is selected to be identical to or different from that of the polymer material layer 83. In one non-limiting embodiment, the carrying layer 84 is an elastic plastic layer, a hard plastic layer or a double sided tape to combine the polymer material layer 83 and the bump 85. The components of the force sensor 800 including the substrate 81, drive electrodes 811 and 815, sensing electrodes 813 and 817, bump 85, adhesive layer 831 and polymer material layer 83 are identical to those of the first embodiment, and thus details thereof are not repeated herein.

Figure 5:
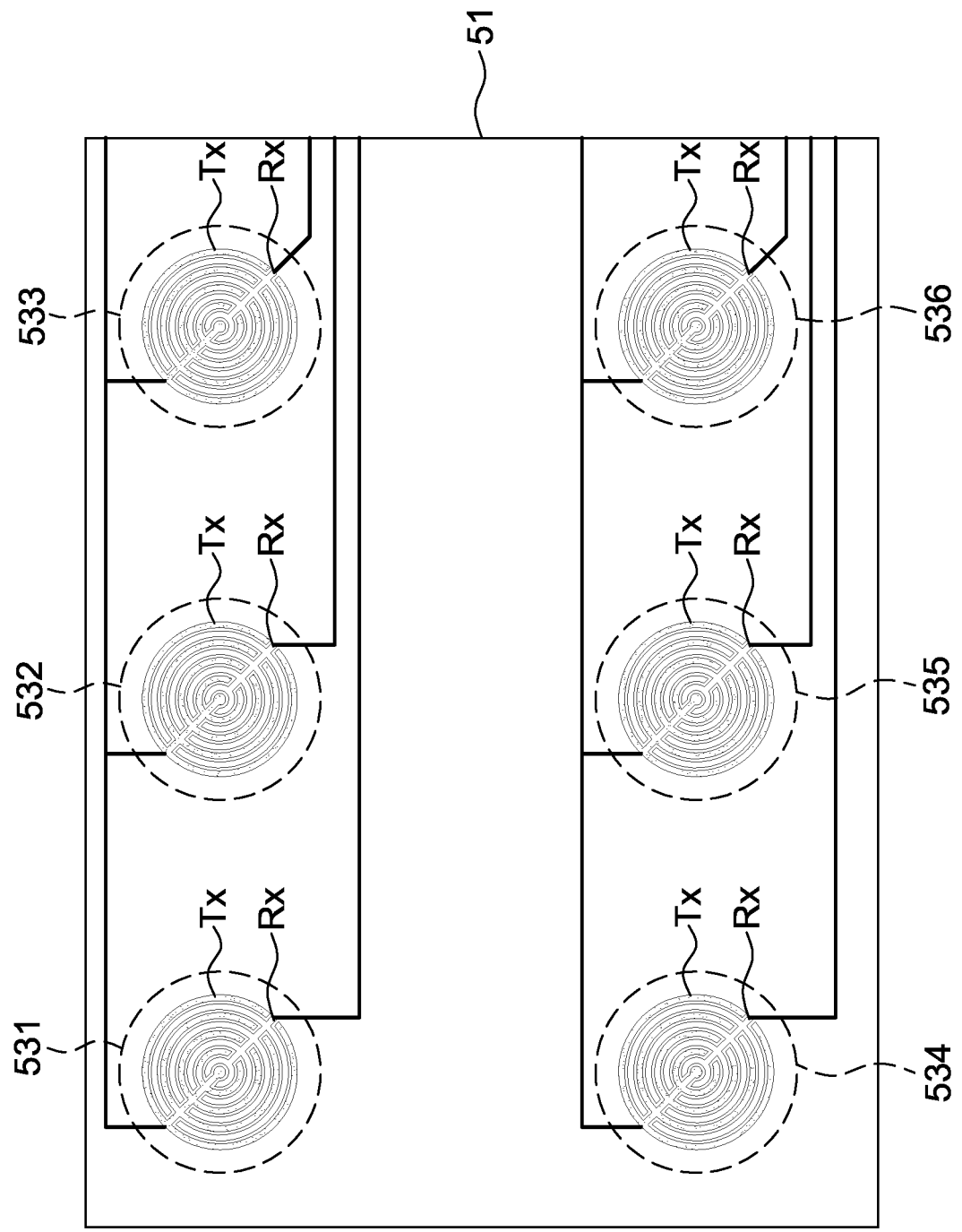
FIG. 5 is a configuration diagram of electrodes and polymer material layers of a force sensor according to one embodiment of the present disclosure.

Referring to FIG. 5, it is a configuration diagram of electrodes and polymer material layers of a force sensor according to one embodiment of the present disclosure. The substrate 51 is laid with multiple sets of drive electrodes Tx and sensing electrodes Rx, and also laid with a plurality of traces respectively connecting to the drive electrodes Tx and sensing electrodes Rx. Each set of drive electrode Tx and sensing electrode Rx is corresponding to one polymer material layer, e.g., 531-536 shown in FIG. 5, so as to form multiple force detecting points on the same substrate 51. The structure of each force detecting point is selected from FIG. 2A-3 or 7-8. The numbers and positions of the multiple force detecting points on the substrate 51 are determined according to actual applications as long as corresponding electrode sets are formed during manufacturing the circuit board. Multiple bumps are respectively arranged, optionally, on the polymer material layer 531-536 corresponding to each of the force detecting points.

Figure 6:
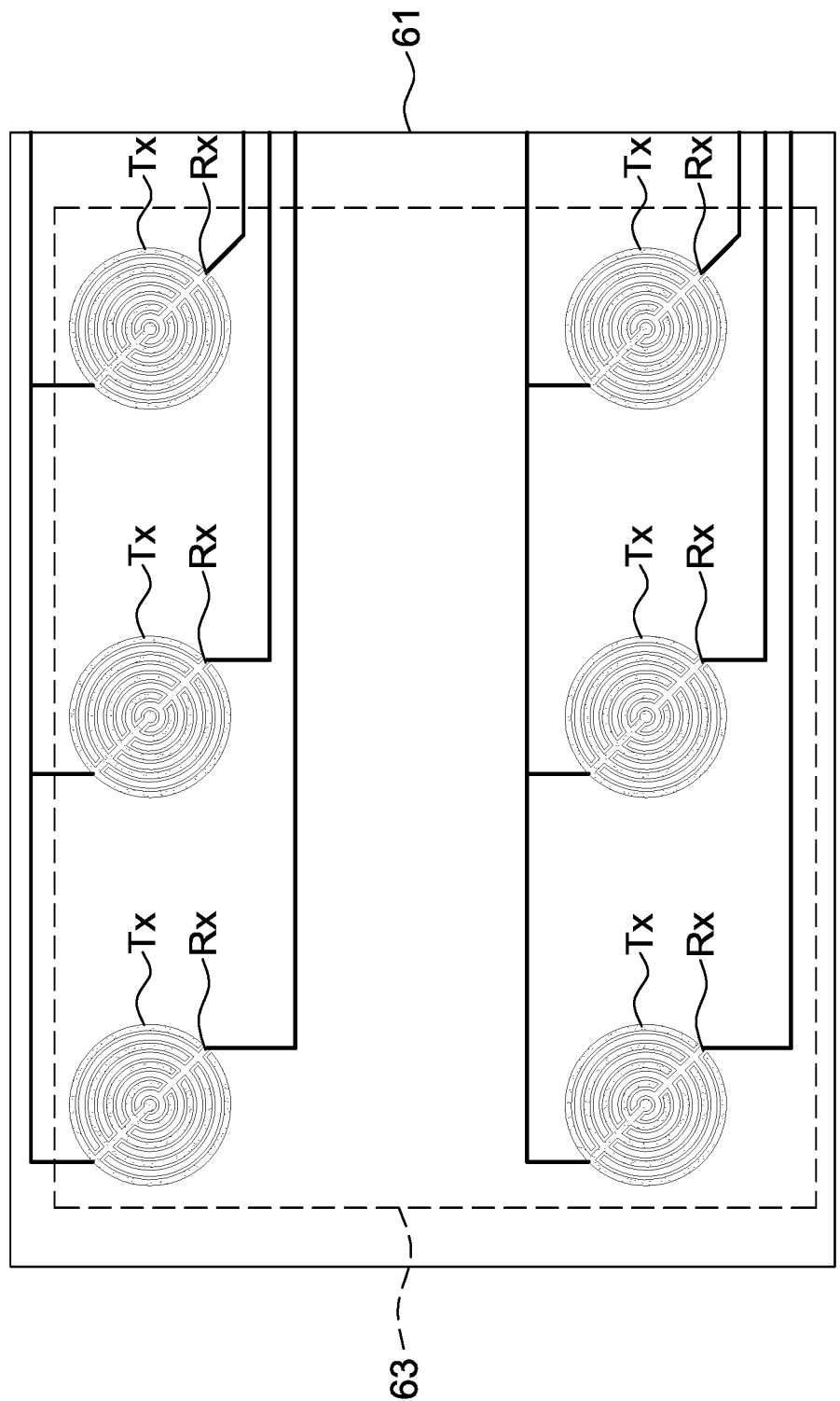
FIG. 6 is another configuration diagram of electrodes and a polymer material layer of a force sensor according to one embodiment of the present disclosure.

Referring to FIG. 6, it is another configuration diagram of electrodes and a polymer material layer of a force sensor according to one embodiment of the present disclosure. The force sensor also includes a substrate 61 and a polymer material layer 63. The substrate 61 has a circuit layout that includes multiple sets of drive electrodes Tx and sensing electrodes Rx, e.g., 6 sets of electrodes arranged in a matrix being shown in FIG. 6. The substrate 61 is further laid with a plurality of traces respectively connecting to the drive electrodes Tx and the sensing electrodes Rx.

In FIG. 6, the polymer material layer 63 is adhered to the substrate 61 and covering on the multiple sets of drive electrodes Tx and sensing electrodes Rx. The difference between FIG. 6 and FIG. 5 is that FIG. 6 employs one polymer material layer 63 to cover multiple electrode sets. Similarly, the polymer material layer 63 is adhered to the substrate 61 via an adhesive layer (not shown). In this embodiment, the adhesive layer is arranged surrounding and/or between the multiple electrode sets. The polymer material layer 63 is also attachable and detachable with the substrate 61.

Similarly, to allow an external force to distribute on the polymer material layer 63 uniformly, the force sensor in FIG. 6 further includes multiple bumps arranged on a surface of the polymer material layer 63 not facing the substrate 61, and each bump is corresponding to one set of drive electrode and sensing electrode, as shown in FIGS. 2A-3 and 7-8 for example. In one non-limiting embodiment, the force sensor in FIG. 6 further includes a carrying layer (as shown in FIG. 8) arranged on a surface of the polymer material layer 63 not facing the substrate 61. The carrying layer has the material identical to or different from the polymer material layer 63. If the carrying layer is used, it is an option to use the bump.

Figure 9:
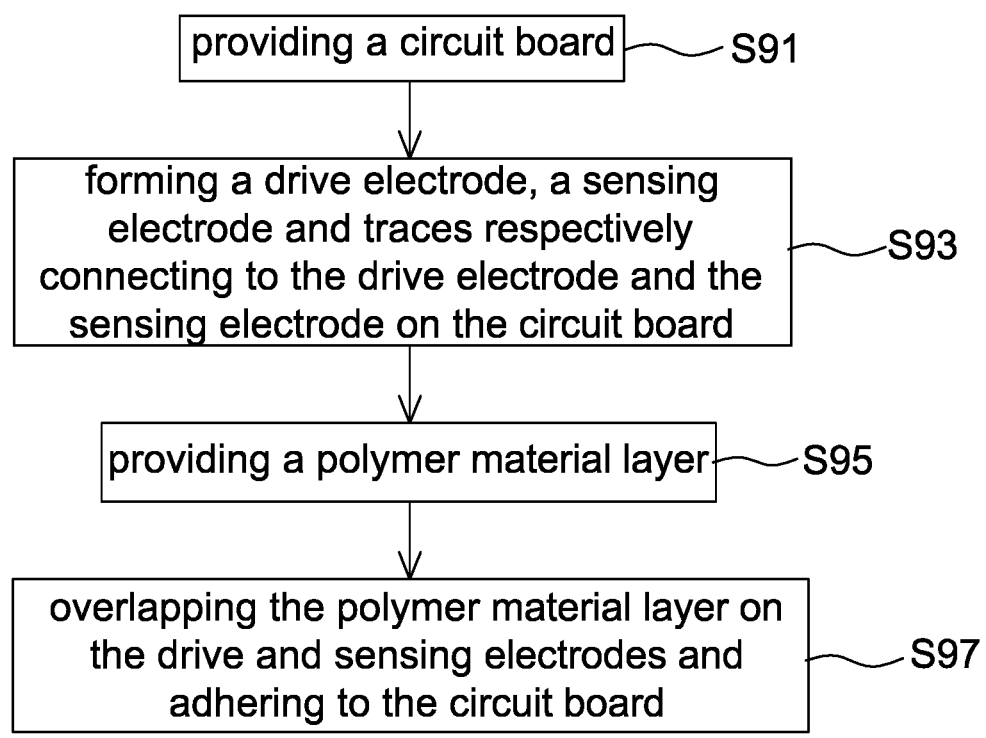
FIG. 9 is a flow chart of a manufacturing method of a force sensor according to one embodiment of the present disclosure.

Referring to FIG. 9, it is a flow chart of a manufacturing method of a force sensor according to one embodiment of the present disclosure, including the steps of: providing a circuit board (Step S91); forming a drive electrode, a sensing electrode and traces respectively connecting to the drive electrode and the sensing electrode on the circuit board (Step S93); providing a polymer material layer (Step S95); and overlapping the polymer material layer on the drive electrode and the sensing electrode and adhering to the circuit board (Step S97).

Referring to FIGS. 3 and 9 together, one aspect of this embodiment is described below.

Step S91: At first, a PCB or FCB is provided, and the circuit traces, electrodes and electrical contacts thereon are determined.

Step S93: Next, the drive electrode 211, the sensing electrode 213 and traces 215, 217 respectively connecting to the drive electrode 211 and the sensing electrode 213 are laid on the substrate 21 using the circuit board manufacturing process. It is appreciated that other traces and electrical contacts are also laid on the circuit board 21. The method of manufacturing a circuit board is known to the art, and thus details thereof are not repeated herein. As the drive electrode 211 and the sensing electrode 213 are already formed on the circuit board 21, an additional connector is no longer required.

Step S95: Next, at least one polymer material layer 23 is provided. The size and shape of the polymer material layer 23 are previously determined according to the range and pattern of the drive electrode 211 and the sensing electrode 213. Then, an adhesive layer 231 is arranged, e.g., coated or adhered, at a proper position on the polymer material layer 23. Accordingly to different electrode patterns, the adhesive layer 231 is arranged at different positions on the polymer material layer 23. In another aspect, the adhesive layer 231 is firstly arranged on the substrate 21 and then adhered to the polymer material layer 23 when combining the substrate 21 and the polymer material layer 23.

When the polymer material layer 23 is carried on a carrying layer, as shown in FIG. 8, the adhesive layer 231 could be selected to be arranged on the carrying layer. The bump 25 is arranged, optionally, on a surface of the carrying layer, and said surface does not face the substrate 21.

Step S97: Finally, the force sensor of the present disclosure is accomplished only by overlapping the polymer material layer 23 on the drive electrode 211 and the sensing electrode 231 and by adhering the polymer material layer 23 to the circuit board 21.

In addition, the bump 25 is arranged, optionally, on a surface of the polymer material layer 23 not facing the circuit board 21, wherein the number, size and position of the bump 25 are determined corresponding to the electrode configuration.

It should be mentioned that although the polymer material layer in figures of the present disclosure is shown to have a plane surface that faces the substrate, it is not to limit the present disclosure. In other embodiments, when the polymer material layer is attached to the electrodes, a part of the polymer material layer extends into a space between the electrodes, i.e., a surface of the polymer material layer facing the substrate is not a plane surface. The part of the polymer material layer attached to the electrodes is thinner, and the rest part of the polymer material layer between the electrodes is thicker.

It is appreciated that the number of components such as a number of the electrodes, traces, bumps, polymer material layers and adhesive layers herein are only intended to illustrate but not to limit the present disclosure.

As mentioned above, the force sensor shown in FIGS. 5 and 6 may be formed as a force sensing array having multiple force detecting points for detecting pressing forces respectively, wherein the structure of each of the force detecting points is selected from FIGS. 2A-3 or FIGS. 7-8 without particular limitations. The multiple force detecting points respectively send the detected signal (i.e. press signal) via traces on the substrate to a processor for the post-processing and control.

Figure 10:
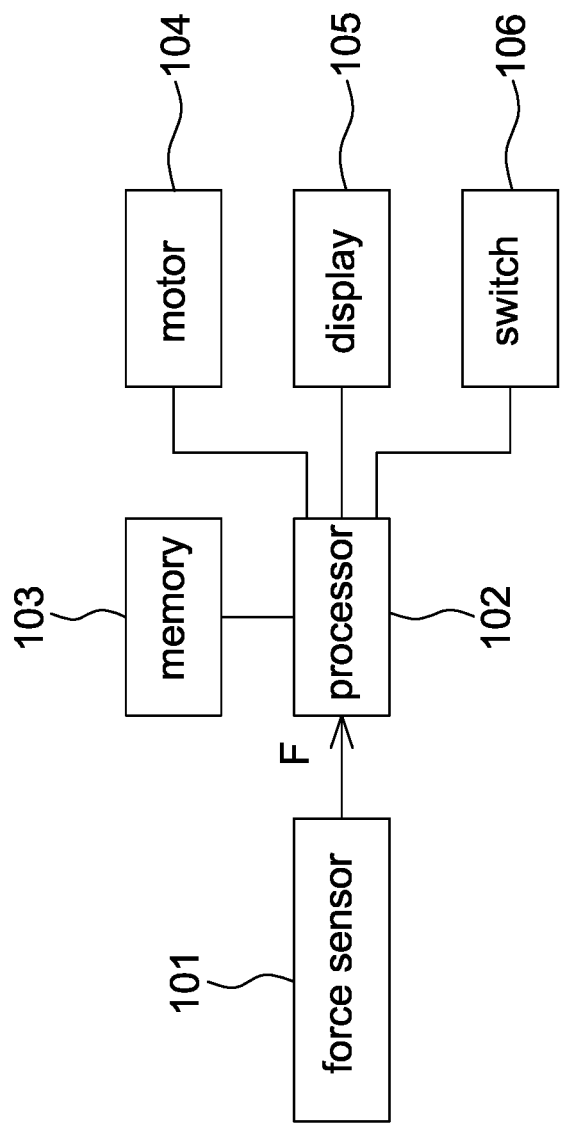
FIG. 10 is a block diagram of an electric toothbrush according to one embodiment of the present disclosure.

Referring to FIG. 10, it is a schematic block diagram of an electric toothbrush adopting the force sensor of the present disclosure, which includes a force sensor 101, a processor 102, a memory 103, a motor 104, a display device 105 and a switch 106. The processor 102, the memory 103, the motor 104, the display device 105 and the switch 106 are preferably arranged in a toothbrush handle of the electric toothbrush, but not limited to. The force sensor 101 is arranged on a toothbrush head and/or the toothbrush handle according to different applications.

The force sensor 101 is, for example, selected from the force sensor shown in FIG. 5 or FIG. 6, and includes a substrate (e.g., 51 in FIG. 5 or 61 in FIG. 6) laid with multiple sets of drive electrodes Tx and sensing electrodes Rx, and includes a polymer material layer (e.g., 531-536 in FIG. 5 or 63 in FIG. 6) adhering to the substrate and covering on the multiple sets of drive electrodes Tx and sensing electrodes Rx to form multiple force detecting points (e.g., 1012 shown in FIG. 11-FIG. 13), and details of the substrate and the polymer material layer have being described above and thus not repeated herein.

Preferably, the polymer material layer is waterproof material, or the toothbrush handle of the electric toothbrush further includes a waterproof layer covering on the force sensor 101 to isolate the water from the force sensor 101.

The processor 102 is, for example, a micro controller unit (MCU), a digital signal processor (DSP) or an application specific integrated circuit (ASIC), and electrically connected to, e.g., via traces shown in FIG. 3 or FIGS. 5-6, the multiple force detecting points of the force sensor 101 to receive multiple force values (i.e. press signals mentioned above) to accordingly control the operation of the electric toothbrush, described by examples below.

The memory 103 is, for example, EEPROM, RAM or Flash memory, but not limited to. The memory 103 is used to record at least one threshold (described by examples below) and measured force values for being accessed by the processor 102.

The motor 104 is controlled by the processor 102 for controlling the operation (e.g., vibration) of the multiple bundles of brush hairs (e.g., 114 shown in FIGS. 11-13) to clear teeth.

The display device 105 is, for example, a liquid crystal display, an OLED display or a Micro-LED display without particular limitations. For example, the display device 105 shows surplus power, pressing state of multiple bundles of brush hairs and/or message of replacing toothbrush head according the operating result of the processor 102.

The switch 106 is used to activate/deactivate or turn on/off the vibration of multiple bundles of brush hairs according to the operating result of the processor 102. For example, the switch 106 is used to control whether the power is provided to the motor 104. The switch 106 is, for example, a transistor switch, a relay switch or the like.

Figure 11:
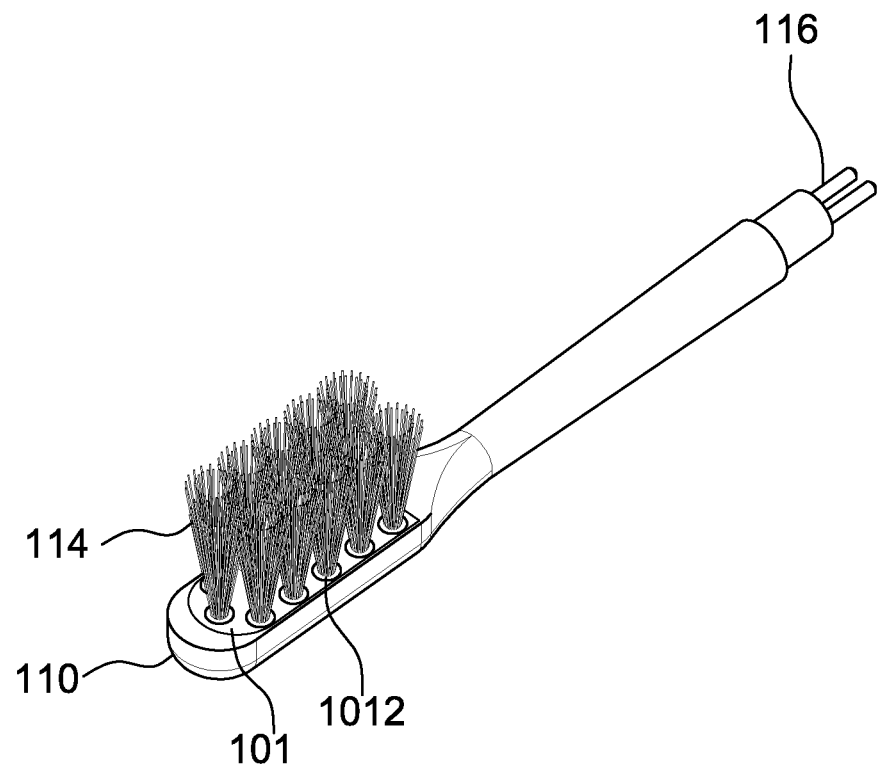
FIG. 11 is a schematic diagram of arranging a force sensor on a toothbrush head of an electric toothbrush according to one embodiment of the present disclosure.

Please referring to FIG. 11, it is a schematic diagram of arranging a force sensor on a toothbrush head of an electric toothbrush according to one embodiment of the present disclosure. A first surface (e.g., the upper surface in FIG. 11) of the toothbrush head 110 is arranged with the force sensor 101 and multiple bundles of brush hairs 114 respectively opposite to the multiple force detecting points 1012 such that each of the force detecting points 1012 is able to detect downward force of each bundle of brush hairs 114. For example, the bottom of each bundle of brush hairs 114 is aligned with the polymer material layer (or the bump) upon a set of drive electrode Tx and sensing electrode Rx such that when the bundle of brush hairs 114 presses downward, the dielectric constant of the corresponding polymer material layer is changed.

It should be mentioned that although FIG. 11 shows that each bundle of brush hairs 114 is opposite to one force detecting point 1012, the present disclosure is not limited thereto. In other aspects, one force detecting point 1012 is opposite to multiple bundles of brush hairs 114 as long as the multiple force detecting points 1012 of the force sensor 101 are able to respectively detect the downward force at different regions of the toothbrush head 110.

It should be mentioned that although in the present disclosure the brush hairs are described as being bundled, the present disclosure is not limited thereto. It is possible that multiple brush hairs (bundled or non-bundled) opposite to one force detecting point 1012 are considered as one brush hair bundle 114 herein.

The toothbrush head 110 includes electrodes 116 used to electrically connect with the toothbrush handle 112 (e.g., referring to FIGS. 12-13) for transmitting data therebetween. The electrodes 116 are electrically connected to (e.g., via multiple traces) the multiple force detecting points 1012 of the force sensor 101 to output multiple force values detected by the multiple force detecting points 1012. It is appreciated that the toothbrush handle 112 includes electrodes corresponding to the electrodes 116.

The processor 102 receives the multiple force values outputted from the multiple force detecting points 1012 of the force sensor 101 and analyzes the force uniformity of the multiple bundles of brush hairs 114, e.g., calculating a standard deviation of the multiple force values. In the present disclosure, as each force detecting point 1012 outputs a respective force value, the processor 102 is able to calculate the pressing force corresponding to different bundles of brush hairs 114 to calculate the force uniformity. In addition, the processor 102 further controls the display device 105 to show the calculated force uniformity thereon. In this way, the user can understand his/her usage habit and the estimated damage of the brush hairs 114.

In one non-limiting aspect, when the multiple bundles of brush hairs 114 are capable of vibrating at different frequencies respectively (e.g., different brush hair bundles being controlled by different motors or shafts), the processor 102 controls the brush hair region having larger pressing force to vibrate at a faster frequency and the brush hair region having smaller pressing force to vibrate at a lower frequency so as to improve the cleaning effect.

In one non-limiting aspect, the processor 102 calculates summations or averages of multiple force values outputted by the multiple force detecting points 1012 for long term recordation. For example, the processor 102 records the daily variation of the force summation or force average during each operation interval to the memory 103. When an accumulation of the daily variation (e.g., continuously decreasing or increasing) exceeds a variation threshold, the processor 102 controls the display device 102 to show the message of replacing the toothbrush head 110. For example, when the brush hairs 114 are used for a long time to have deformation or fragmentation, the processor 102 obtains different force summations or force averages. Accordingly, by previously setting the variation threshold before shipment, it is able to identify whether to actively inform the user to replace the toothbrush head 110 by continuously monitoring the force summation or force average.

It should be mentioned that the recordation of a variation of force summation or force average is not limited to daily based, and the force summation or force average may be recorded using different time intervals, e.g., weekly based.

In another non-limiting aspect, the processor 102 further controls the motor 104 of the electric toothbrush to activate or turn on the vibration of the multiple bundles of brush hairs 114 when a summation or average of the multiple force values exceeds an activation threshold (e.g., setting before shipment). For example, when a user turns on the power of the electric toothbrush, the display device 105 and the force sensor 101 are turned on but the vibration of the multiple bundles of brush hairs 114 is not activated or turned on. After the user presses the multiple bundles of brush hairs 114 on the tooth surface to cause the force sensor 101 to output multiple force values that have the summation or average thereof exceeding an activation threshold, the processor 102 controls the motor 104 to activate the multiple bundles of brush hairs 114 to vibrate at a predetermined vibration frequency. After the multiple bundles of brush hairs 114 start to vibrate, the processor 102 turns off the vibration of the multiple bundles of brush hairs 114 when identifying that the summation or average of the multiple force values is lower than a deactivation threshold (e.g., identical to or different from the activation threshold) for a predetermined time interval (e.g., 3 to 5 seconds, but not limited to), i.e. not being used for the predetermined time interval.

Figure 12:
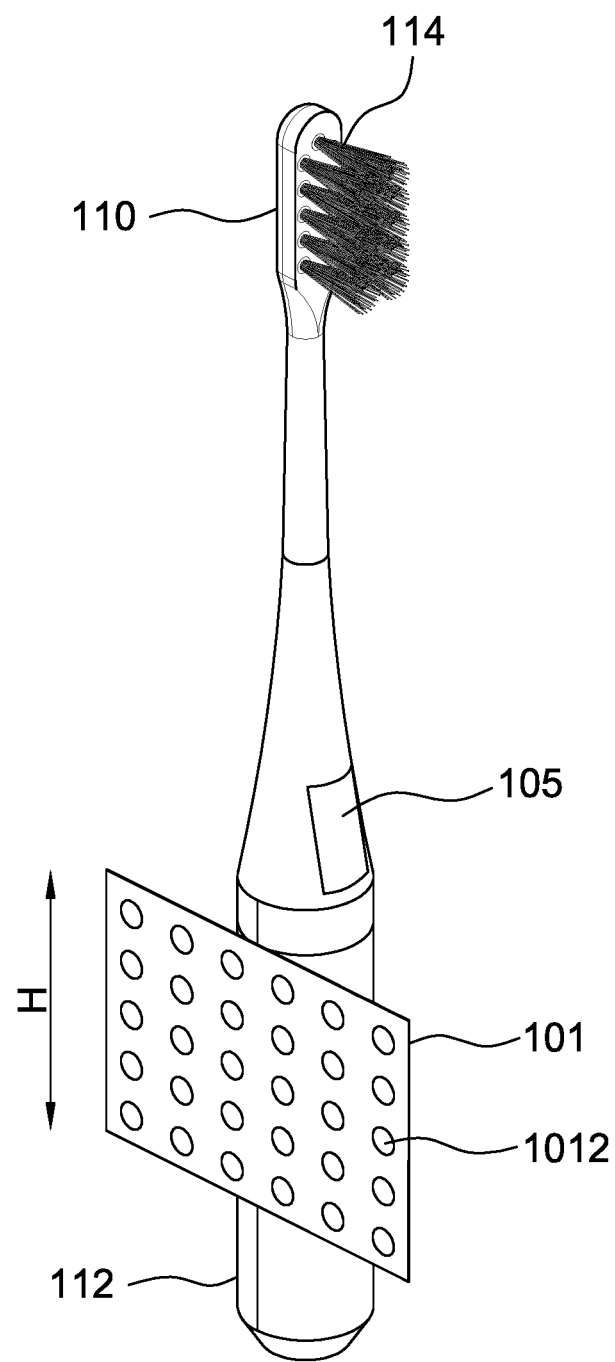
FIG. 12 is a schematic diagram of arranging a force sensor on a toothbrush handle of an electric toothbrush according to one embodiment of the present disclosure.

Referring to FIG. 12, it is a schematic diagram of arranging a force sensor on a toothbrush handle of an electric toothbrush according to one embodiment of the present disclosure, wherein the toothbrush head 110 is attachable to and detachable from the toothbrush handle 112. The force sensor 101 is surrounded on the toothbrush handle 112 to cause multiple force detecting points 1012 of the force sensor 101 to uniformly surrounding a partial surface of the toothbrush handle 112. As shown in FIG. 12, each direction of a surface of the toothbrush handle 112 is arranged with force detecting points 1012 to fit different usage habits of different users. In the present disclosure, the force sensor 101 preferably surrounds and covers most of surface (e.g., between ½ and ⅔ thereof) of the toothbrush handle 112. For example, the most of surface has a height H preferably larger than a width of 3 human fingers (e.g., 4.5 cm to 5.5 cm) such that no matter how the user holds the toothbrush handle 112, at least a part of the multiple force detecting points 1012 are pressed. In this aspect, the toothbrush head 110 is selected not to arrange the force sensor 101.

Similarly, the processor 102 receives multiple force values outputted by the multiple force detecting points 1012 and calculates a summation or average of the multiple force values, and controls a vibration frequency of the multiple bundles of brush hairs 114 according to the calculated summation or average. In other words, in this aspect, the user adjusts the vibration strength of the multiple bundles of brush hairs 114 by simply changing the holding strength without using any knob, touch panel or key such that the user experience is improved. For example, when the summation or average is higher, the vibration frequency is higher; otherwise, the vibration frequency is lower.

In one non-limiting aspect, the processor 102 further identifies whether to activate or turn on the vibration of the multiple bundles of brush hairs 114 according to a summation or average of the multiple force values. For example, when a user turns on the power of the electric toothbrush, the display device 105 and the force sensor 101 are turned on but the vibration of the multiple bundles of brush hairs 114 is not activated or turned on. After the user holds the toothbrush handle 112 to cause the summation or average of the multiple force values outputted by the multiple force detecting points 1012 to exceed an activation threshold, the processor 102 controls the motor 104 to activate the multiple bundles of brush hairs 114 to vibrate at a predetermined vibration frequency; on the contrary, when the summation or average is smaller than the activation threshold, the processor 102 does not activate the vibration of the multiple bundles of brush hairs 114.

Similarly, after the multiple bundles of brush hairs 114 start to vibrate, the processor 102 turns off the vibration of the multiple bundles of brush hairs 114 when identifying that the summation or average of the multiple force values is lower than a deactivation threshold (e.g., identical to or different from the activation threshold) for a predetermined time interval (e.g., 3 to 5 seconds, but not limited to), i.e. not being used for the predetermined time interval.

In the present disclosure, in addition to directly calculating a pressing force of the multiple bundles of brush hairs 114 onto the teeth as shown in FIG. 11, it is able to indirectly calculate the pressing force of the multiple bundles of brush hairs 114 onto the teeth. Please referring to FIG. 13, it is an operational schematic diagram of the electric toothbrush of FIG. 12.

Figure 13:
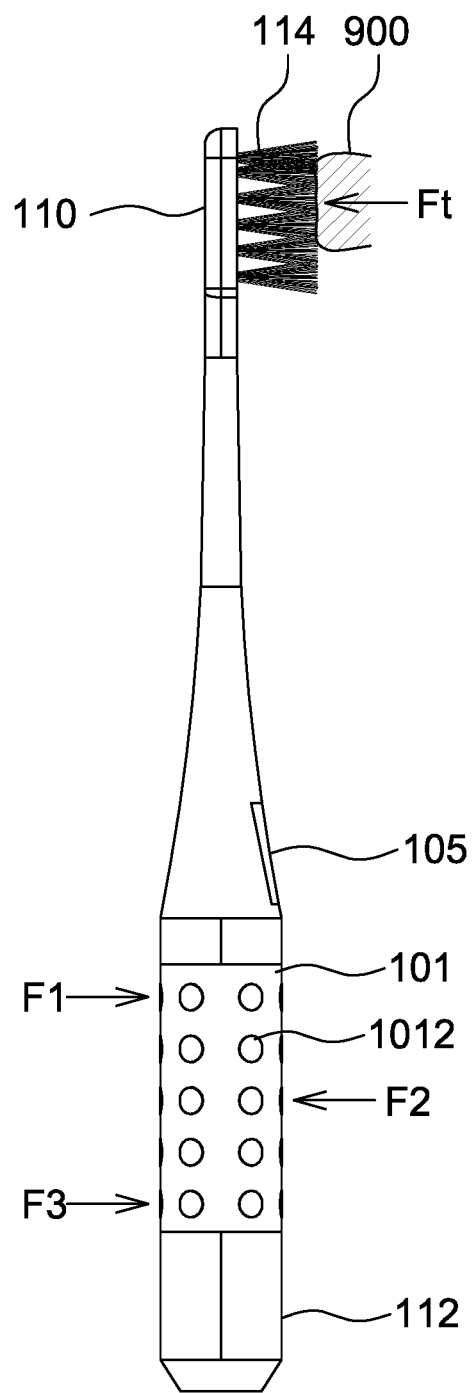
FIG. 13 is an operational schematic diagram of the electric toothbrush of FIG. 12.

When a user holds the toothbrush handle 112 to clean the teeth 900, the processor calculates a first direction force (e.g., F1 and F3) and a second direction force (e.g., F2) after receiving multiple force values from the multiple force detecting points 1012. The processor 102 calculates a pressing force of the multiple bundles of brush hairs 114 to the teeth 900 according to a force difference between the first direction force and the second direction force. For example in FIG. 13, since the pressing force Ft of the teeth 900 to the multiple bundles of brush hairs 114 is considered to be equal to (F1+F3−F2), it is known that the pressing force from the multiple bundles of brush hairs 114 to the teeth 900 is also equal to Ft. As shown in FIG. 13, preferably the first direction force and the second direction force are respectively calculated according to the force value outputted by at least one force detecting point 1012 at opposite directions (e.g. shown as left-right directions) among the multiple force detecting points 1012. When F1 to F3 are respectively calculated using multiple force values outputted by the multiple (e.g., adjacent to one another) force detecting points 1012, F1 to F3 are respectively a summation or average of associated multiple force values.

It is appreciated that as different users will hold the toothbrush handle 112 using different ways, the number and direction of the first direction force and the second direction force are not limited to those shown in FIG. 13. In this aspect, the pressing force from the multiple bundles of brush hairs 114 is indirectly calculated using the force sensor 101 arranged on the toothbrush handle 112 instead of directly calculated using the force sensor 101 arranged on the toothbrush head 110. That is, the pressing force from the multiple bundles of brush hairs 114 is not calculated according to the multiple force detecting points 1012 of the opposite brush hair bundles 114.

Similarly, the processor 102 also calculates a force summation (e.g., F1+F2+F3) or a force average of the first direction force and the second direction force, and controls a vibration frequency of the multiple bundles of brush hairs 114 according to the calculated force summation or force average. For example, the processor 102 compares the force summation or the force average with multiple force thresholds (e.g., previously stored in the memory 103) to adjust different vibration frequencies. When the force summation or the force average becomes larger or smaller, the vibration frequency is changed higher or lower in a step-by-step manner.

Similarly, the processor 102 further identifies whether to activate or turn on the vibration of the multiple bundles of brush hairs 114 according to a force summation or a force average of the first direction force and the second direction force. For example, when a user turns on the power of the electric toothbrush, the display device 105 and the force sensor 101 are turned on but the vibration of the multiple bundles of brush hairs 114 is not activated or turned on. After the user holds the toothbrush handle 112 to cause the force summation or the force average of the first direction force and the second direction force to be larger than or equal to an activation threshold, the processor 102 controls the motor 104 to activate the multiple bundles of brush hairs 114 to vibrate at a predetermined vibration frequency; on the contrary, when the calculated force summation or force average of the first direction force and the second direction force is smaller than the activation threshold, the processor 102 does not activate the vibration of the multiple bundles of brush hairs 114.

Similarly, after the multiple bundles of brush hairs 114 start to vibrate, the processor 102 turns off the vibration of the multiple bundles of brush hairs 114 when identifying that the force summation or the force average of the first direction force and the second direction force is lower than a deactivation threshold (e.g., identical to or different from the activation threshold) for a predetermined time interval (e.g., 3 to 5 seconds, but not limited to), i.e. not being used for the predetermined time interval.

In one non-limiting aspect, as the multiple force detecting points 1012 in FIGS. 12-13 are arranged to cover most of surface of the toothbrush handle 112, the processor 102 further recognizes different users based on different holding positions such that the electric toothbrush is exclusive to a specific user. For example, the electric toothbrush is selected to enter a learning stage or an operation stage. In the learning stage, the processor 102 recognizes the holding positions (e.g., positions of force detecting points 1012 outputting the force value larger than a predetermined threshold) to be recorded in the memory 103. In the operation stage, if a user does not hold within a deviation range of the recorded positions (e.g., a number of force detecting points not identical to the multiple force detecting points 1012 being recorded), the vibration of the electric toothbrush is not turned on.

The aspect shown in FIGS. 12-13 is also adaptable to other electronic devices, such as electric hair removing device or other electronic devices that can control the output strength of a motor according to a summation or average of the total holding force of hand.

It should be mentioned that although in the above embodiments the force sensor 101 is arranged on the toothbrush head 110 or the toothbrush handle 112, the present disclosure is not limited thereto. In other aspects, different force sensors are respectively arranged on the toothbrush head 110 and the toothbrush handle 112 to perform the operations mentioned above.

It should be mentioned that the vibration of the electric toothbrush mentioned above is not particularly limited. The present disclosure is to adjust the vibration strength according to the detection result of the force sensor 101, and is not limited to adjust the vibration frequency. For example, the vibration direction or the part of vibrated brush hairs is adjusted according to the detection result of the force sensor 101 depending on different applications.

As mentioned above, the conventional force sensor is not directly integrated with a circuit board such that an additional connector is required to connect said conventional force sensor to the circuit board. Accordingly, the present disclosure further provides a force sensor (e.g., FIGS. 2-8) and a manufacturing method thereof (e.g., FIG. 9). The drive electrode and the sensing electrode of the force sensor are formed on the circuit board together with the manufacturing of the circuit board. Finally, the manufacturing of the force sensor is accomplished only by attaching and adhering a polymer material layer to an electrode region such that the force sensor of the present disclosure has a simple manufacturing process and low cost.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electric toothbrush, comprising:
 a force sensor, comprising:
  a substrate laid with multiple sets of drive electrodes and sensing electrodes; and
  a polymer material layer adhering to the substrate and covering on the multiple sets of drive electrodes and sensing electrodes to form multiple force detecting points;
 a toothbrush head, a first surface of the toothbrush head being arranged with the force sensor and multiple bundles of brush hairs respectively opposite to the multiple force detecting points of the force sensor; and
 a processor, coupled to the multiple force detecting points, and configured to analyze a force uniformity of the multiple bundles of brush hairs according to multiple force values outputted by the multiple force detecting points.

2. The electric toothbrush as claimed in claim 1, wherein the force sensor further comprises an adhesive layer for adhering the polymer material layer to the substrate.

3. The electric toothbrush as claimed in claim 1, wherein the force sensor further comprises multiple bumps arranged on a surface of the polymer material layer not facing the substrate, and each of the multiple bumps is corresponding to one set of drive electrode and sensing electrode.

4. The electric toothbrush as claimed in claim 1, wherein the polymer material layer is waterproof material.

5. The electric toothbrush as claimed in claim 1, further comprising a display device, wherein the processor is further configured to control the display device to show the force uniformity thereon.

6. The electric toothbrush as claimed in claim 1, further comprising a memory and a display device, wherein the processor is further configured to
 calculate a summation or an average of the multiple force values outputted by the multiple force detecting points,
 record a daily variation of the summation or the average to the memory, and
 control the display device to show a message of replacing the toothbrush head when an accumulation of the daily variation exceeds a variation threshold.

7. The electric toothbrush as claimed in claim 1, further comprising a motor, wherein the processor is further configured to
 calculate a summation or an average of the multiple force values outputted by the multiple force detecting points, and
 control the motor to activate vibration of the multiple bundles of brush hairs when the summation or the average exceeds an activation threshold.

8. An electric toothbrush, comprising:
 a force sensor, comprising:
  a substrate laid with multiple sets of drive electrodes and sensing electrodes; and
  a polymer material layer adhering to the substrate and covering on the multiple sets of drive electrodes and sensing electrodes to form multiple force detecting points;
 a toothbrush head, a first surface of the toothbrush head being arranged with multiple bundles of brush hairs;
 a toothbrush handle, the multiple force detecting points of the force sensor being arranged surrounding the toothbrush handle; and
 a processor, coupled to the multiple force detecting points, and configured to
  calculate a summation or an average of multiple force values outputted by the multiple force detecting points, and
  control a vibration frequency of the multiple bundles of brush hairs according to the summation or the average.

9. The electric toothbrush as claimed in claim 8, when the vibration frequency is positively related to the summation or the average.

10. The electric toothbrush as claimed in claim 8, wherein the multiple detecting points are uniformly arranged on a partial surface of the toothbrush handle, and a height of the partial surface is larger than a width of 3 human fingers.

11. The electric toothbrush as claimed in claim 8, further comprising a motor, wherein
 when the summation or the average is smaller than an activation threshold, the processor is not configured to control the motor to activate vibration of the multiple bundles of brush hairs, and
 when the summation or the average is larger than or equal to the activation threshold, the processor is configured to control the motor to activate the vibration of the multiple bundles of brush hairs with a predetermined vibration frequency.

12. The electric toothbrush as claimed in claim 8, wherein the force sensor further comprises an adhesive layer for adhering the polymer material layer to the substrate.

13. The electric toothbrush as claimed in claim 8, wherein the force sensor further comprises multiple bumps arranged on a surface of the polymer material layer not facing the substrate, and each of the multiple bumps is corresponding to one set of drive electrode and sensing electrode.

14. The electric toothbrush as claimed in claim 8, wherein the polymer material layer is waterproof material.

15. An electric toothbrush, comprising:
 a force sensor, comprising:
  a substrate laid with multiple sets of drive electrodes and sensing electrodes; and
  a polymer material layer adhering to the substrate and covering on the multiple sets of drive electrodes and sensing electrodes to form multiple force detecting points;
 a toothbrush head, a first surface of the toothbrush head being arranged with multiple bundles of brush hairs;
 a toothbrush handle, the multiple force detecting points of the force sensor being arranged surrounding the toothbrush handle; and
 a processor, coupled to the multiple force detecting points, and configured to
  calculate a first direction force and a second direction force according to multiple force values outputted by the multiple force detecting points, and
  calculate a pressing force of the multiple bundles of brush hairs according to a force difference between the first direction force and the second direction force.

16. The electric toothbrush as claimed in claim 15, wherein the multiple detecting points are uniformly arranged on a partial surface of the toothbrush handle, and a height of the partial surface is larger than a width of 3 human fingers.

17. The electric toothbrush as claimed in claim 15, wherein the first direction force and the second direction force are respectively calculated according to the force value outputted by at least one force detecting point at opposite directions among the multiple force detecting points.

18. The electric toothbrush as claimed in claim 15, wherein the processor is further configured to
- calculate a force summation or a force average of the first direction force and the second direction force, and
- control a vibration frequency of the multiple bundles of brush hairs according to the force summation or the force average.

19. The electric toothbrush as claimed in claim 18, wherein the processor is configured to adjust the vibration frequency by comparing the force summation or the force average with multiple force thresholds.

20. The electric toothbrush as claimed in claim 15, further comprising a motor, wherein the processor is further configured to
- calculate a force summation or a force average of the first direction force and the second direction force,
- when the force summation or the force average is smaller than an activation threshold, not control the motor to activate vibration of the multiple bundles of brush hairs, and
- when the force summation or the force average is larger than or equal to the activation threshold, control the motor to activate the vibration of the multiple bundles of brush hairs with a predetermined vibration frequency.

\* \* \* \* \*